No. 817,042. PATENTED APR. 3, 1906.
T. BURNS.
BORING TOOL, REAMER, AND THE LIKE.
APPLICATION FILED FEB. 6, 1905.
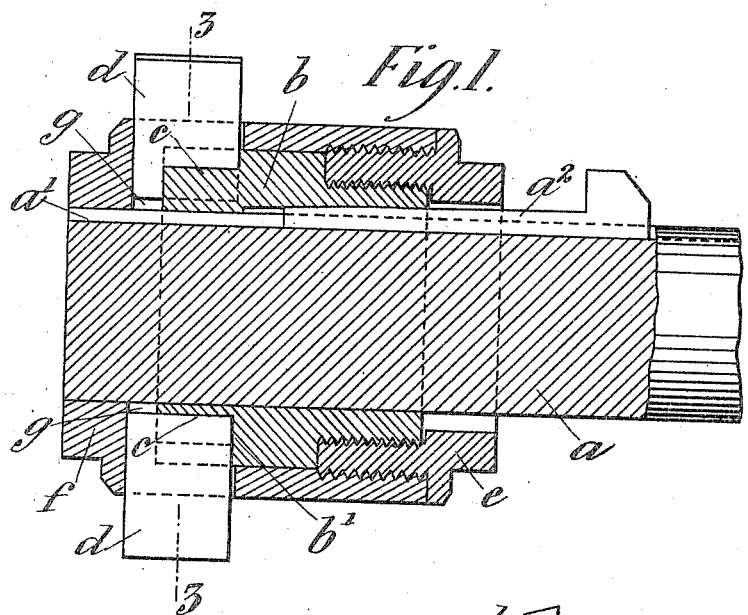
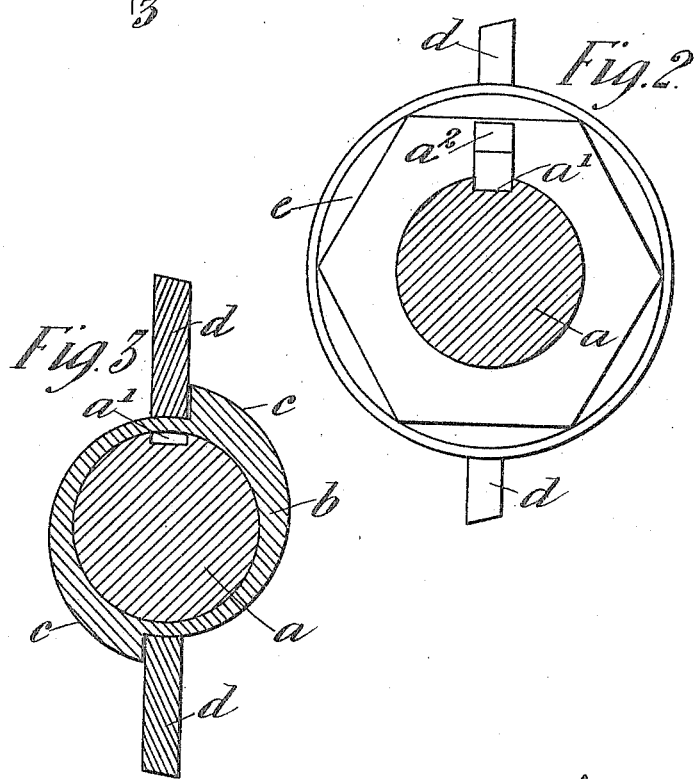

UNITED STATES PATENT OFFICE.

THOMAS BURNS, OF LEEDS, ENGLAND.

BORING-TOOL, REAMER, AND THE LIKE.

No. 817,042.  Specification of Letters Patent.  Patented April 3, 1906.

Application filed February 6, 1905. Serial No. 244,353.

*To all whom it may concern:*

Be it known that I, THOMAS BURNS, engineer, a subject of the King of Great Britain, residing at Well House, Meadow Road, Leeds, in the county of York, England, have invented certain new and useful Improvements in Boring-Tools, Reamers, and the Like, of which the following is a specification.

This invention relates to boring-tools, reamers, and the like; and it consists in improvements therein whereby the amount of metal in the cutters is reduced, the cutters may be adjusted to compensate for wear, and holes of different diameters may be bored or reamered by means of one and the same set of cutters. To attain these objects, the tool-holder is constructed substantially as illustrated in the accompanying drawings, in which—

Figures 1 and 2 are respectively a longitudinal section and an end elevation of the improved tool, and Fig. 3 is a transverse section thereof on line 3 3 of Fig. 1.

The spindle $a$ of the tool-holder is formed, as by providing it with a key-seat $a'$ and a key $a^2$, to receive a sleeve $b$ and retain it so as to prevent rotation thereof on the spindle. The forward end of the sleeve $b$ is shaped to form or has attached to it two or more volute cams $c$, the common axis of which is coincident with the axis of the spindle and the depth of which from front to rear is somewhat less than the breadth of the cutters $d$. The central part of the sleeve $b$ has an abutment-collar $b'$ for the cutters, and the rear part is screw-threaded externally for the reception of a locking-sleeve $e$.

Surrounding the sleeve $b$ and the end of the spindle $a$ and mounted as a sliding fit thereon is a bush $f$, having its forward end preferably shaped as a nut to facilitate assembling the parts and extending rearwardly beyond the central part of the sleeve $b$. This extension is screw-threaded internally for the reception of the locking-sleeve $e$, which is screw-threaded both externally and internally. The bush $f$ has two or more radial longitudinal slots $g$ near its forward end of a length slightly greater than the breadth of the cutters and a breadth to admit the cutters easily.

In the construction illustrated there are two similar volute cams $c$, upon which the inner ends of the cutters $d$ abut, oppositely disposed to each other and having each an angular length of two right angles; but obviously more than two cams may be used should there be any advantage to be derived from using more than two cutters, so long as the arrangement is such that for a given relative angular displacement of the bush $f$ and sleeve $b$ there is equal radial displacement of the several cutters.

The screw-threads on the sleeve $b$, bush $f$, and locking-sleeve $e$ are arranged so that when the cutters $d$ are inserted in the slots $g$ and the locking-sleeve $e$ is screwed home the bush $f$ and sleeve $b$ are drawn together to seize the cutters firmly between the collar $b'$ of the sleeve and the forward ends of the slots $g$. This may be done, as shown in the drawings, by making the screw-threads on the bush and sleeves of equal pitch and of the same sense, or differential screw-threads may be used to increase the leverage in the usual well-known manner.

It will be obvious that in order to compensate for wear of the cutters it is necessary merely to slacken the locking-sleeve $e$ slightly, turn the bush $f$ on the sleeve $b$, so as to project the cutters to the required extent, and again clamp the parts by screwing home the locking-sleeve, the rear end of which is formed to receive a suitable spanner or other lever for this purpose. Further, the same adjustment obviously provides means for boring holes of different diameters with one and the same set of cutters. Also, since by the construction herein described the cutters do not extend in one piece through the bush and boring-spindle, as is commonly the case, there is also a considerable initial saving in the amount of metal required for the cutters.

To facilitate the rapid adjustment of the cutters for the boring of holes of various diameters, a suitable scale is formed on the periphery of the bush or locking-sleeve, the lowest reading of which scale would be arranged to coincide with a fiducial mark on the other relatively movable part when the inner ends of the cutters rest on the lowest parts of the cam-surfaces.

Adjustable reamers and mandrels may be constructed precisely as herein described, except that in the former case three or more cutters and an equal number of cams would be used and in the latter case, instead of cutters, drivers which are not backed off to form cutting edges are substituted. The invention may also be applied to lathes and drilling-machines, a boring-tool for which may be made by forming cams similar to those described on one end of a shaft which is drilled and tapped to receive a screwed bolt or stud. A bush having holes for the cutters is placed over the end of the bar and moved lengthwise thereof by means of a nut on the bolt or stud and held fast thereon by means of a lock-nut, the cutters being adjusted by a rotary movement of the bush, as before.

Having thus described the nature of my said invention and the best means I know of carrying the same into practical effect, I claim—

1. In tools for boring or widening holes, a spindle, a seating rotating with the said spindle, a bush surrounding the said spindle and having radial longitudinal slots, cutters passing through said slots and having their inner ends resting on said seating, and a locking-sleeve engaging the seating and bush to draw them together to clamp the cutters, substantially as described.

2. In tools for boring or widening holes such as herein described, radial cutters, seatings for said cutters consisting of cam-surfaces, a bush surrounding said seatings and rotatable with relation thereto, said bush being formed with radial slots to receive the cutters, and a screw-threaded locking-sleeve engaging the said seatings and bush and adapted to draw them together; substantially as described.

3. A boring or widening tool comprising a spindle, a sleeve keyed thereon and having part of its surface formed as a plurality of symmetrical volute cams, and another part externally screw-threaded, radial cutters having their inner ends seated on said volute cams, a bush surrounding said sleeve and having radial slots through which said radial cutters extend, said bush being internally screw-threaded at one end, a locking-sleeve screw-threaded externally and internally and adapted to engage the said bush and sleeve to draw them together and lock the said cutters, substantially as described.

In testimony whereof I have signed my name to this specification in the presence of two subscribing witnesses.

THOMAS BURNS.

Witnesses:
WM. BURNS,
JOSHUA NORTH.